US006367034B1

(12) United States Patent
Novik et al.

(10) Patent No.: US 6,367,034 B1
(45) Date of Patent: Apr. 2, 2002

(54) USING QUERY LANGUAGE FOR EVENT FILTERING AND AGGREGATION

(75) Inventors: Lev Novik, Bellevue; Raymond McCollum, Monroe; Irena Hudis, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/158,171

(22) Filed: Sep. 21, 1998

(51) Int. Cl.⁷ .............................................. G06F 11/00
(52) U.S. Cl. .............................. 714/39; 707/3; 709/318
(58) Field of Search ........................... 714/39, 48, 57; 707/103, 3, 6; 709/318, 321

(56) References Cited

U.S. PATENT DOCUMENTS

| | | | | |
|---|---|---|---|---|
| 5,857,190 A | * | 1/1999 | Brown ........................ | 707/10 |
| 6,138,121 A | * | 10/2000 | Costa et al. ................. | 707/100 |
| 6,167,448 A | * | 12/2000 | Hemphill et al. ........... | 709/224 |
| 6,275,957 B1 | * | 8/2001 | Novik et al. ................. | 714/39 |
| 6,314,533 B1 | * | 11/2001 | Novik et al. ................. | 714/39 |

* cited by examiner

*Primary Examiner*—Robert Beausoleil
*Assistant Examiner*—X. Chung-Trans
(74) *Attorney, Agent, or Firm*—Workman, Nydegger, Seeley

(57) ABSTRACT

Systems and methods for reporting the occurrence of events in a computer system to event subscriber software. A computer system includes an event-filtering component that receives notification of the occurrence of events, filters the events, and reports selected events to the subscriber software. The event-filtering component can expose standardized interfaces to the event providers that report events and to the subscriber software to which events are reported. Filtering can be facilitated by event-filtering definitions written in a query language and associated with the subscriber software. The definitions are processed in the context of an object-oriented, hierarchical classification of event classes that comprehend any possible events that can be reported by the event providers. When reported events satisfy one or more query-based filtering definitions, the events are passed to the appropriate subscriber software. Otherwise, the events are discarded. Events can be filtered and grouped according to the time of their occurrence. Filtering can be further simplified by registering event-reporting definitions defining the scope of events to be reported by particular event providers.

24 Claims, 9 Drawing Sheets

USING QUERY LANGUAGE FOR EVENT FILTERING AND AGGREGATION

BACKGROUND OF THE INVENTION

1. The Field of the Invention

The present invention relates to systems and methods for reporting the occurrence of events in a computer system to event subscriber software. More specifically, the present invention relates to filtering events detected by event detection components of a computer system in order to identify a subset of the events that has been requested by the event subscriber software.

2. The Prior State of the Art

As computers and computer network systems have become more sophisticated, processes for detecting the occurrence of events in hardware and software components have become increasingly important and complex. Knowledge of events occurring in computer systems allows management software to reliably identify the components and configuration of a computer system, to respond to hardware failure, or to otherwise monitor and improve the efficient operation of the system. The range of events that may be detected by computer systems and reported to management or other subscriber applications is essentially unlimited. Examples of computer detectable events, to name just a few, include disk drive activity and errors, installation or deinstallation of hardware components, network server activities and failures, and home, business, or network security breaches.

Events are often detected by drivers associated with hardware components, operating system software, and instrumentation specifically designed to monitor hardware or software. As the number of hardware components, the complexity of software, and the size of computer networks have grown over the years, it has become increasingly difficult to create management applications that can become aware of the occurrence of events in an efficient manner.

FIG. 1 is a schematic diagram illustrating a conventional approach for informing an event subscriber application of the occurrence of events. A computer system 10 has a plurality of device drivers 12 operating in kernel mode and an event subscriber 14 operating in user mode. The event subscriber can be, for example, a management program for monitoring events occurring in computer system 10 and responding thereto to improve system efficiency. Computer system 10 also has a Simple Network Management Protocol (SNMP) provider 16, which is a computer-executable program, written to a standard protocol, for detecting events occurring in a network, such as network 18 of FIG. 1.

Event subscriber 14 can be any computer-executable program written to respond to selected events detected by drivers 12, SNMP provider 16, or both. Event subscriber 14 could be local (as shown in FIG. 1) or instead could be on a remote machine with respect to computer system 10. Other systems have used other types of event subscribers/consumers instead of event subscribers. In order to learn of the events detected by drivers 12, the executable code of event subscriber 14 must have been written to be compatible with the interfaces 20 exposed by drivers 12. Likewise, in order to learn of events occurring in network 18, the executable code of event subscriber 14 must be written to be compatible with the interface 22 exposed by SNMP provider 16.

The requirement that event subscribers in conventional systems must be compatible with and issue the proper requests to interfaces associated with event providers, drivers, or other instrumentation for detecting events has introduced an undesirable amount of complexity to the process of monitoring events. In many cases, the event subscriber 14 must be written to many different types of interfaces, particularly when the number of device drivers or event providers becomes large.

In conventional systems, such as that illustrated by FIG. 1, any filtering of events reported by the event providers or drivers has been conducted at each event subscriber 14. Thus, any events detected by drivers 12 or by SNMP provider 16 in this example would be reported to event subscriber 14, whether it is local, as shown, or located at a remote machine. If event subscriber 14 were interested in only a subset of all the events detected by the system, the events not of interest would be discarded at event subscriber 14 after they had been transmitted thereto. As a result, the transmission of notifications of events from multiple drivers and event providers has generated large amounts of data traffic, much of which is not of interest to the event subscribers. This problem has been particularly evident in systems having remote event subscribers, in which notifications of events are transmitted over a network infrastructure. Thus, as the number of detected events and the number of drivers 12 and event providers such as SNMP provider 16 grows large, the data traffic generated in computer system 10 and in associated networks can be significant.

In view of the foregoing, there is a need in the art for systems to facilitate the reporting of the occurrence of events from event providers, drivers, and other instrumentation. It would be an advancement in the art to provide system for reporting events that do not require the writers of event subscriber applications to have a complete knowledge of the various interfaces associated with drivers and event providers. It would also be advantageous to provide systems that could allow only the events of interest to event subscribers to be reported thereto, while events not of interest are not reported, thereby decreasing the network traffic that has been needed in prior art systems. Such systems would be particularly valuable if they could notify subscribers of the occurrence of events regardless of the capabilities of the source of the events (i.e., event providers, instrumentation, etc.).

SUMMARY AND OBJECTS OF THE INVENTION

The present invention relates to systems and methods for filtering events detected by event providers in computer systems in order to report to subscriber programs only those events that are of interest. Substantially any events capable of being detected by computers or instrumentation associated with computers can be filtered and reported according to the invention. Examples include, but are not limited to, disk drive activity and errors, installation or deinstallation of hardware components, network server activities and failures, and home, business, or network security breaches.

Filtering is performed by an event-filtering component that provides a standardized interface to event providers and to subscriber programs. In one implementation, filtering is conducted by associating event-filtering definitions written in query language with the subscriber programs. The terms of the query-based definitions establish thresholds and filtering conditions that permit only the events of interest to particular subscriber programs to be reported thereto. Moreover, the query-based definitions can be implemented in an event-filtering component relatively close to the source of the events, thereby reducing the data traffic that has been needed in prior art systems to notify subscriber programs of the occurrence of events. For example, the query-based definitions can permit filtering to occur at a local machine before transmitting notifications of events to subscriber programs located at remote machines. Subscriber programs also do not need to be written to provide filtering, since the rich event-filtering capabilities of the invention are built into the infrastructure of the systems of the invention.

In order to establish a context in which the query-based event-filtering definitions can be understood and processed, the computer system can also include a schema repository storing an object-oriented event classification of event classes. The event classes defined in the event classification comprehend a set of possible events, in the sense that any event detected and reported by the event providers belongs to one of the event classes. The event classification can be defined hierarchically, such that event classes are related one to another in parent/child relationships.

As occurrences of events are reported to the event-filtering component by the event providers, the events are compared with the event-filtering definitions to identify the events that are to be reported to the subscriber programs. The events that satisfy one or more of the event-filtering definitions are reported to the corresponding subscriber programs, while the events that do not satisfy any event-filtering definition are discarded or otherwise not sent to the subscriber programs.

The event-filtering component can also maintain event-reporting definitions associated with the event providers to efficiently match event providers to subscriber programs. To present just one example, if an event-reporting definition associated with a particular event provider specifies that any event reported by the event provider necessarily satisfies an event-filtering definition associated with a particular subscriber program, the filtering process become relatively simple. In this situation, when the event-filtering component receives notification of the occurrence of an event from the foregoing event provider, the event-filtering component can report the event to the subscriber program without having to examine the parameters of the event.

A conventional query language, such as that typically used to retrieve data associated with relational databases, can be extended to filter events on the basis of the time of their occurrence. For example, event-filtering definitions can specify that events are to be grouped and reported according to selected time intervals. This feature is particularly useful to manage the reporting of frequent events that would otherwise consume large amounts of resources if the events were to be individually reported. The event-filtering definitions can also specify that the event-filtering component is to poll drivers or other instrumentation at a selected frequency when there exists no event driver to report the occurrence of particular events.

The use of the event-filtering component in the computer systems can also provide a standardized interface to which subscriber programs and event providers can be written. Using the standardized interface, the subscriber programs register with the event-filtering component of the invention to define which events are to be delivered to the subscriber programs. The event-filtering component provides notification of events to the registered subscriber programs regardless of the capabilities of the event providers, instrumentation, or other sources of the events. If there is no event provider associated with a requested event, the systems of the invention poll the event data sources directly to detect the occurrence of the event. Such functionality is transparent from the standpoint of the subscriber program, which receives notification of events in a standard way regardless of the type of event providers included in the system, or whether event providers are included in the system at all. In addition, subscriber programs do not need to be written to particular interfaces associated with the event providers, drivers, and other instrumentation.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer-readable media having computer-executable instructions or data fields stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data fields and which can accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Suitable Computing Environment

Figure 1:
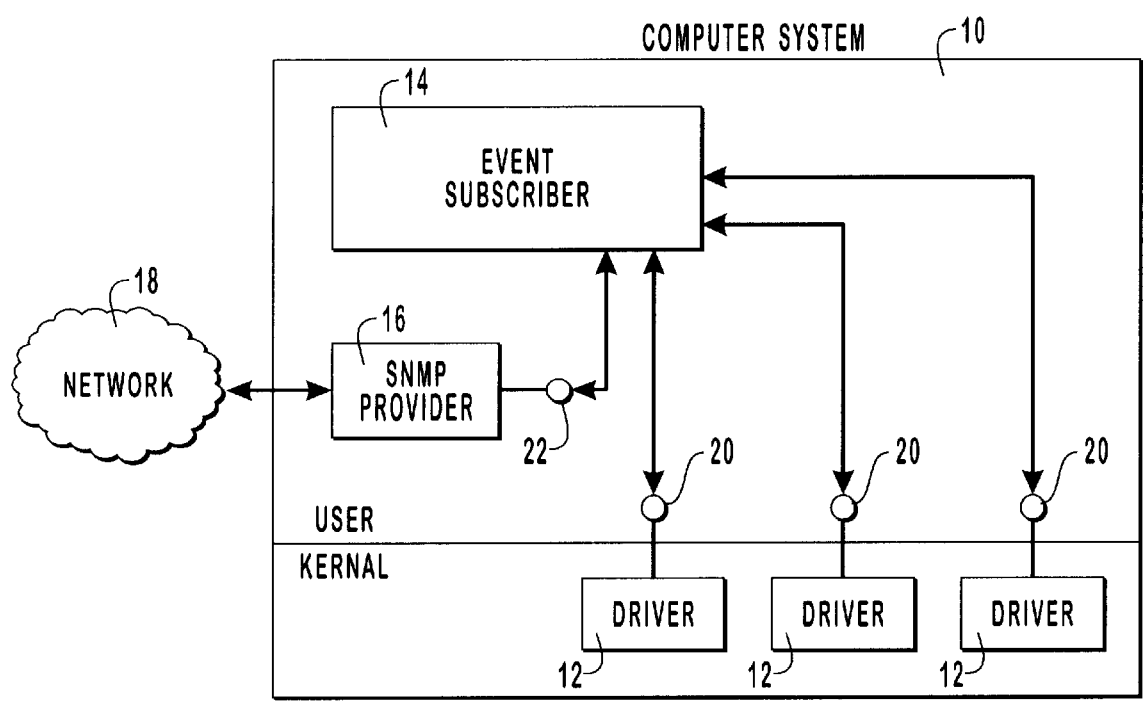
FIG. 1 is a schematic diagram illustrating a prior art system for detecting events in a computer system.
Figure 2:
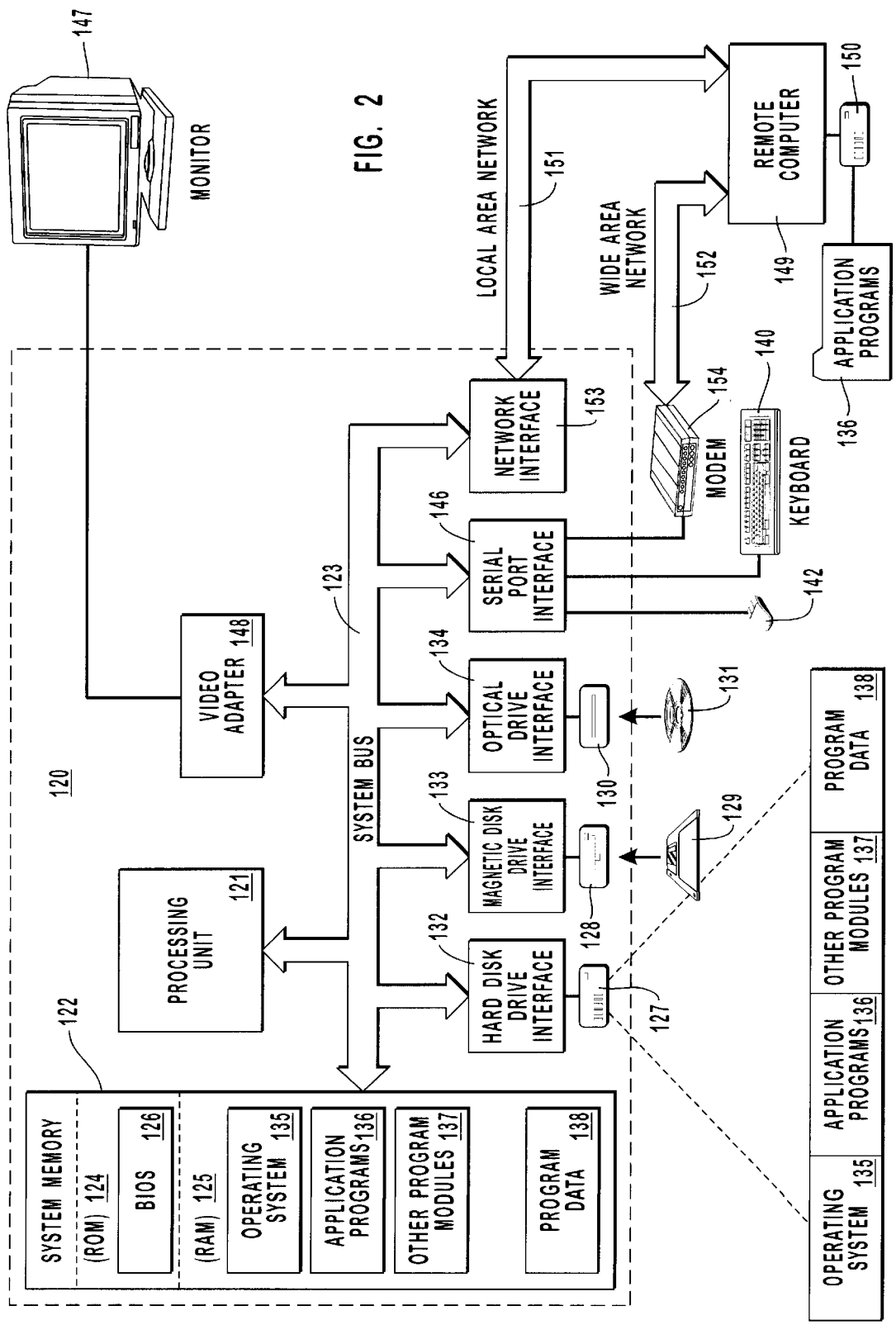
FIG. 2 is an example system that provides a suitable operating environment for the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help to transfer information between elements within the computer 120, such as during start-up, may be stored in ROM 124.

The computer 120 may also include a magnetic hard disk drive 127 for reading from and writing to a magnetic hard disk, not shown, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer readable instructions, data structures, program modules and other data for the computer 120. Although the exemplary environment described herein employs a magnetic hard disk 127, a removable magnetic disk 129 and a removable optical disk 131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the computer 120 through input devices such as a keyboard 140 and pointing device 142. Other input devices (not shown) may include a microphone, joy stick, game pad, satellite dish, scanner, or the like. These and other input devices are often connected to the processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to the computer 120, although only a memory storage device 150 has been illustrated in FIG. 2. The logical connections depicted in FIG. 2 include a local area network (LAN) 151 and a wide area network (WAN) 152 that are presented here by way of example and not limitation. Such networking environments are commonplace in offices enterprise-wide computer networks, intranets and the Internet.

When used in a LAN networking environment, the computer 120 is connected to the local network 151 through a network interface or adapter 153. When used in a WAN networking environment, the computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing a communications link between the computers may be used.

System Overview

The invention is described herein in the context of reporting the occurrence of events from an event-filtering component to an event subscriber. It is to be understood that events may be reported from event-filtering components, or cores, to any desired "event subsciber", which is defined herein as any hardware component, software component, program module, peripheral, or the like, capable of receiving reports of the occurrence of events. Event subscribers can be management computer programs or any other event consumer. Event subscribers can be local or instead can be located remotely and communicate with the event-filtering component by means of a network infrastructure.

As used herein, the term "event" is to be given its ordinarily understood meaning, and can refer to an event occurring in a computer, a computer network, or the environment of a computer. For example, events can refer to activity in hardware or software components, and can also include installation, deinstallation, or modification of hardware or software components.

The term "event provider", as used herein, extends to hardware or software components that can report the occurrence of events to the event-filtering components of the invention. For example, event providers are often programs or program modules operating in user mode in a computer system. Event providers are typically notified of the occurrence of events by "event-detection components", which is defined herein to include operating systems and drivers operating in kernal mode and other instrumentation for directly measuring, monitoring, or detecting events in computers, computer networks, or the environment of a computer system. The term "computer system" extends to any computer or computer network, either alone or in combination with peripherals or other hardware.

As used herein, the term "reporting" in reference to events includes the act of notifying a hardware or software component of the occurrence of one or more events. Delivering notification of the occurrence of an event from an event-filtering component to an event subscriber and publishing events by event providers are both examples of event reporting.

Figure 3:
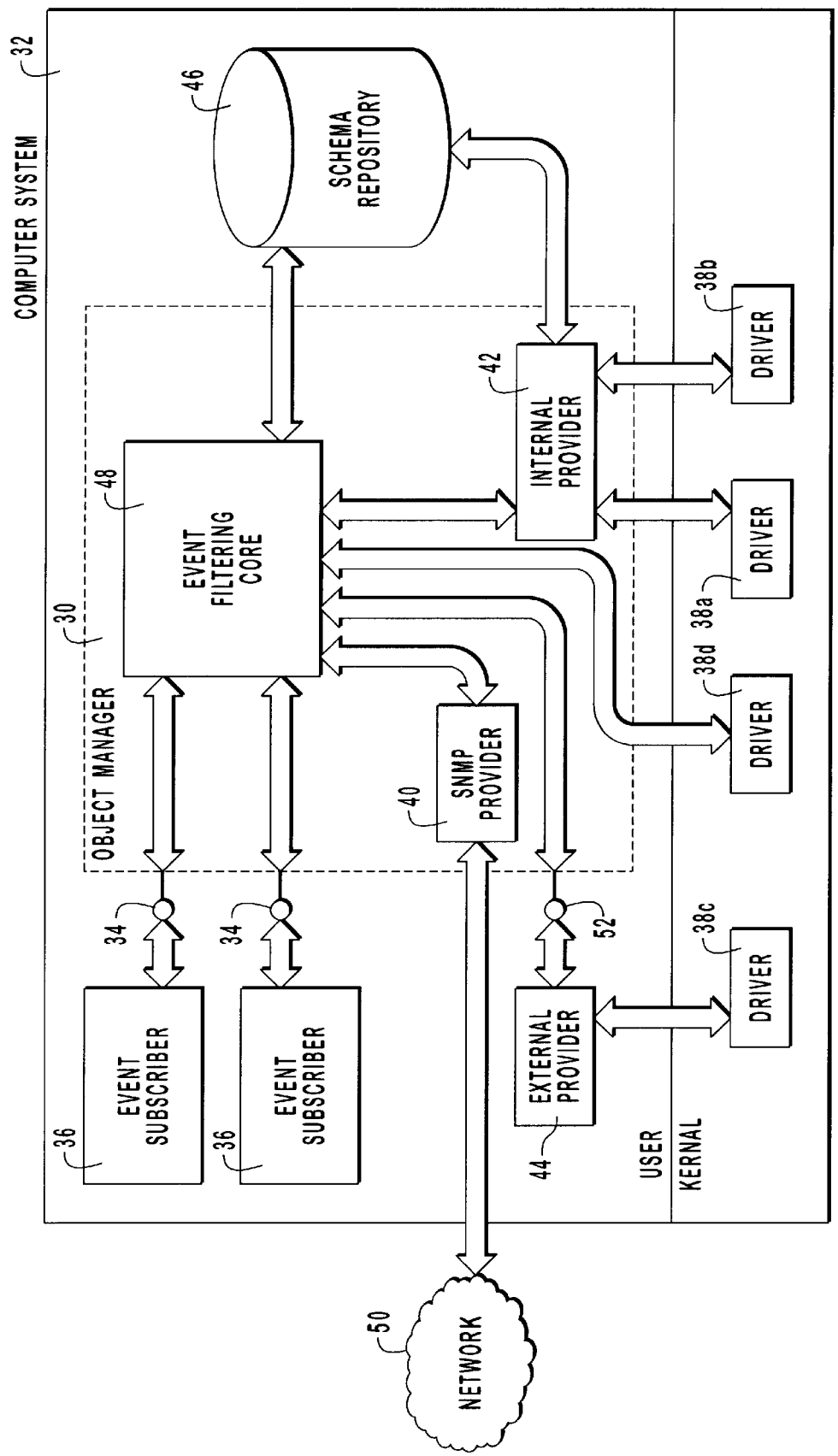
FIG. 3 is a schematic diagram illustrating a system of the invention for filtering events detected in a computer system and reporting the filtered events to an event subscriber.

FIG. 3 is a schematic diagram depicting one embodiment of the invention in which a computer system includes an object manager providing a standard interface for event subscribers and event providers. Object manager 30 of computer system 32 has a standard interface 34 through which it can communicate with one or more event subscribers 36. In this embodiment, object manager 30 has another standard interface 52 through which it can communicate with one or more external event providers 44. The occurrence of events is reported to an event-filtering core 48 of object manager 30 by drivers 38, SNMP provider 40, internal event provider 42, external event provider 44, or other instrumentation.

SNMP provider 40 reports the occurrence of events on a network, such as network 50, using a standard protocol well-known in the art. Internal provider 42 is internal in the sense that it is integrated with object manager 30 and can communicate with other components of the object manager without the use of a communications hub or similar hardware. In this example, SNMP provider 40 is another example of an internal event provider. When object manager 30 is practiced in a Windows NT environment, for example, internal providers 42 can include Win32 event providers and Windows Management Instrumentation (WMI) providers.

Although object manager 30 may be equipped with internal providers 42 as described above, the invention is particularly useful for reporting events detected by one or more external event providers 44. External event provider 44 is external in the sense that it communicates with the object manager 48 via a communications link and a standardized interface 52. External provider 44 may be written by a manufacturer different from the supplier of object manager 30. In this manner, any original equipment manufacturer (OEM) can extend the driver that controls the function of its hardware to include an external event provider 44 that can communicate with object manager 30 via standardized interface 52. Indeed, object manager 30 and event-filtering core 48 allow events to be efficiently reported to event subscribers 36 without the manufacturers of external providers 44 and the manufacturers of the event subscribers having a detailed knowledge of one another.

As shown in the example of FIG. 3, events detected by event drivers 38*a* and 38*b* are reported to event-filtering core 48 by internal provider 42. Events detected by event driver 38*c* are reported by external provider 44, while events occurring on network 50 are reported by SNMP provider 40. Drivers 38*a*–*d* are examples of event-detection components. The systems of the invention can also report events detected by drivers or other instrumentation without the assistance of intermediate event providers in a polling operation that is discussed in greater detail below. For example, driver 38*d* has no associated event provider. Instead, object manager 30 periodically communicates directly to driver 38*d* to learn of the occurrence of events detected thereby.

In one embodiment of the invention, a schema repository 46 defines an object-oriented, hierarchical classification of event classes. The event classes allow event-filtering core 48 to efficiently determine the scope of the events that are to be reported to event subscribers 36 and the events that may be reported by event providers 40, 42, and 44. The Common Information Model (CIM), which is an industry standard for classifying data established by the Desktop Management Task Force (DMTF), is just one example of a suitable schema for use with the invention. Event classifications are described in greater detail below in reference to FIG. 4.

Event providers 40, 42, and 44 send notifications to event-filtering core 48 of the occurrence of events, and the event-filtering core then filters the events to identify those that are to be reported to one or more of the event subscribers 36. In one embodiment, the filtering is conducted by comparing the event classes of the events and parameters of the events to event-filtering definitions, which can be written in a query language. The event classifications defined in schema repository gives context to query-based filtering definitions, thereby allowing event-filtering core 46 to filter the events. Event filtering is described in greater detail below in reference to FIGS. 5A–9.

Event Classification

Figure 4:
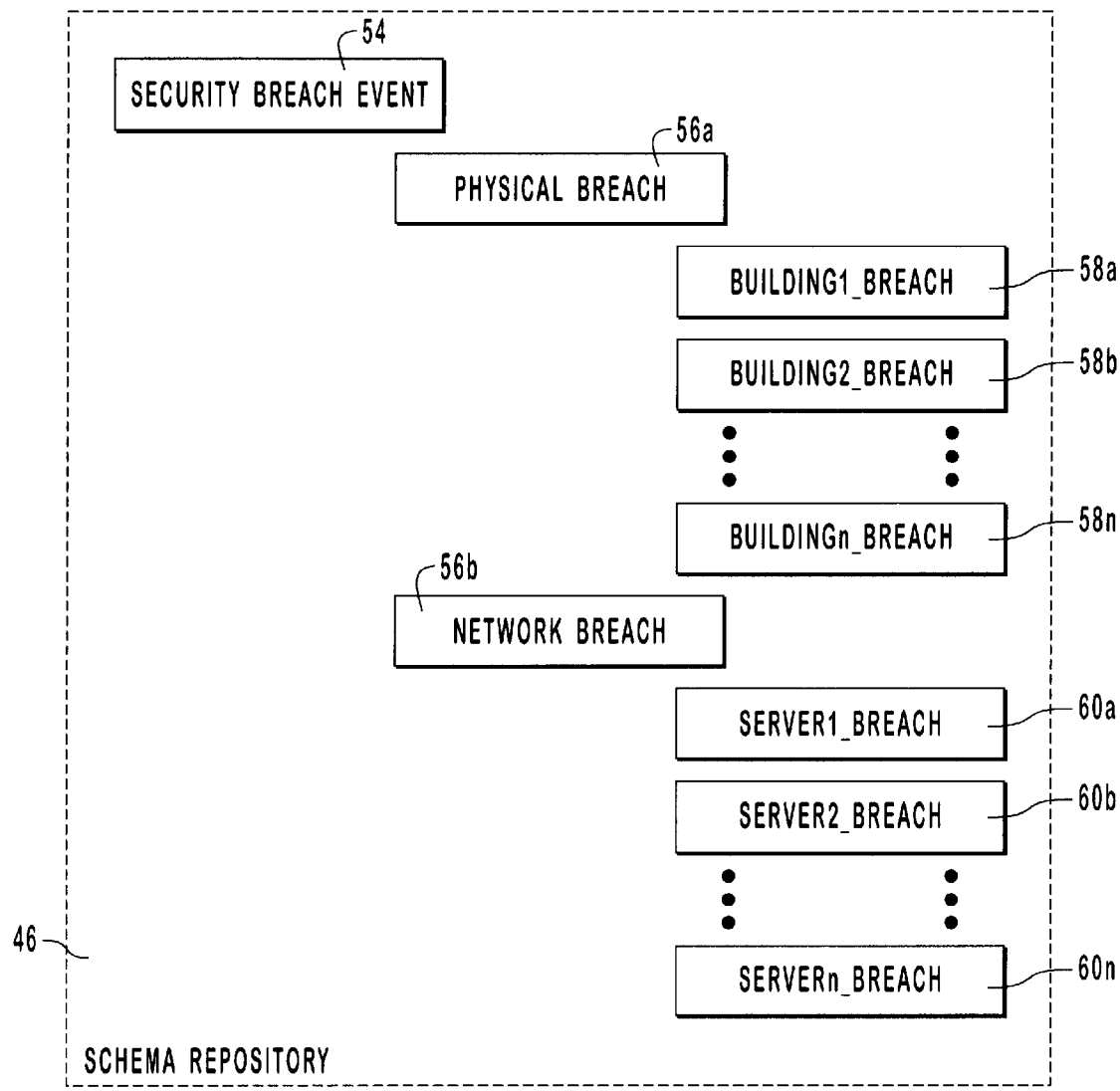
FIG. 4 shows an example of a portion of a schema that defines a hierarchical classification of event classes.

As shown in FIG. 4, embodiments of the systems of the invention include a schema repository 46 that defines an object-oriented, hierarchical classification of event classes.

The classification defined in schema repository 46 may be very similar in structure to schema defining relational database objects. In one embodiment, each event that is reported to event-filtering core 48 of FIG. 3 belongs to one or more event classes defined in a schema repository 46. Accordingly, the event classes defined in schema repository 46 comprehend a set of possible events that can be reported to event-filtering core 48 by event providers 40, 42, and 44 or by other sources.

Figure 5A:
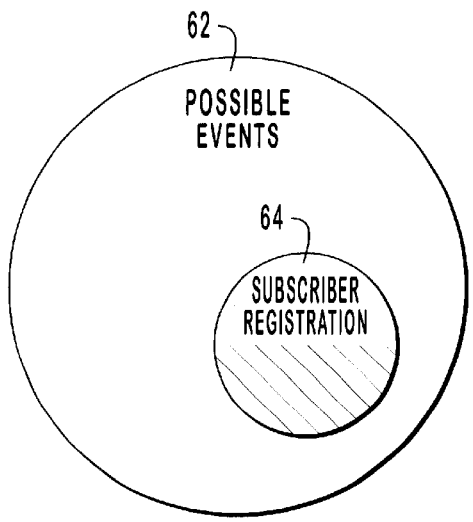
FIG. 5A is a Venn diagram depicting a set of possible events and a subset of events to be reported to an event subscriber.
Figure 5B:
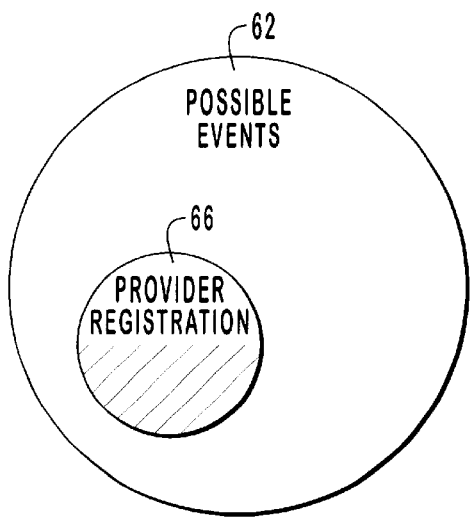
FIG. 5B is a Venn diagram illustrating a set of possible events and a subset of events to be detected and reported by an event provider.
Figure 5C:
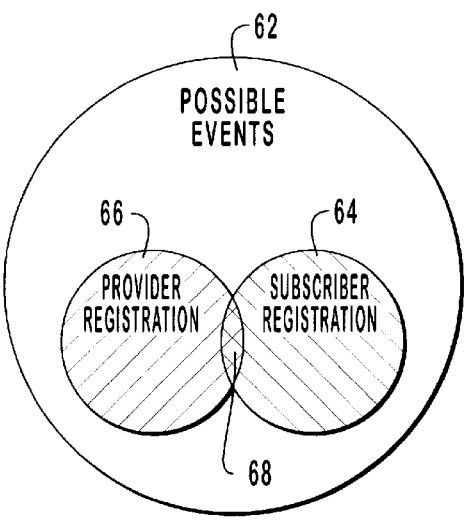
FIG. 5C is a Venn diagram illustrating the intersection of the subset of FIG. 5A and the subset of FIG. 5B.
Figure 5D:
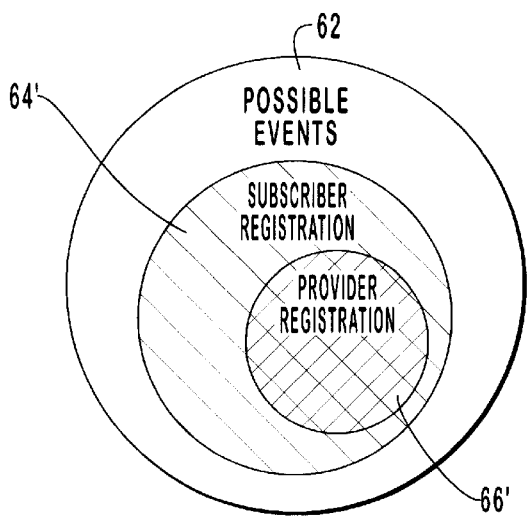
FIG. 5D is a Venn diagram illustrating a subset of events reported by an event provider that is subsumed by a subset of events to be reported to an event subscriber.
Figure 6:
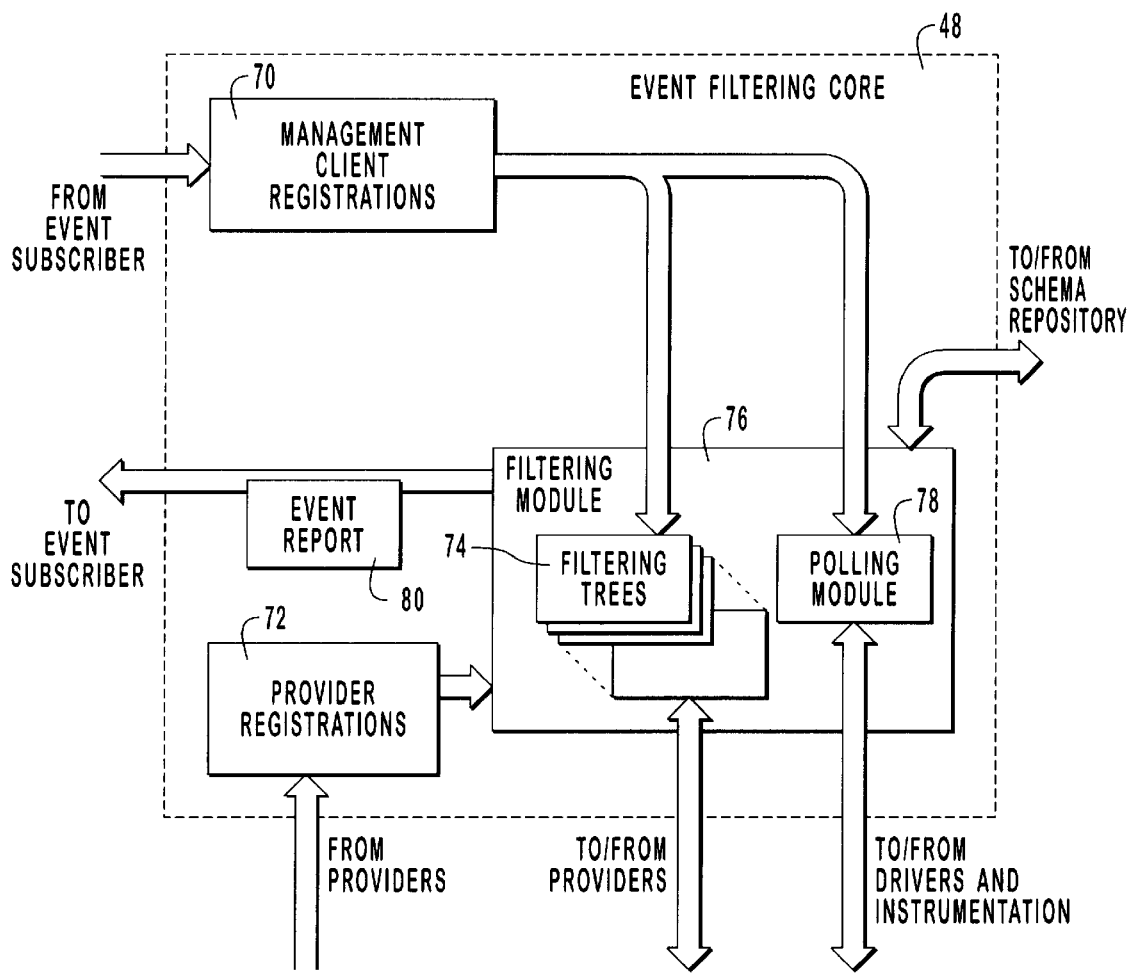
FIG. 6 is a schematic diagram further illustrating elements of the event-filtering core of FIG. 3.

As will be further discussed in reference to FIGS. 5A–6, event definitions, which may be written in query language, define a subset of the set of possible events comprehended by the event classes defined in a schema repository 46 of FIG. 4. A schema defined in schema repository 46 of FIG. 4 may be as detailed as desired and can be constructed to relate to the types of events that are to be detected by the computer system. As noted herein, the CIM schema or an extension thereof can be used with the invention. The schema can instead be defined by the entity that creates object manager 30 or can be an extension of a previously existing schema. In order for event subscribers 36 and event providers 40, 42, and 44 to be compatible with the systems of the invention, regardless of their manufacturers, it can be useful to publish any particular event classification that is used in a system operating according to the invention.

To illustrate the structure of an event classification, FIG. 4 includes a portion of a classification directed to the detection of security breaches in buildings or networks. It should be understood that the event classes illustrated in FIG. 4 are presented for illustration purposes only and that the event classes in any particular system can be selected to include the types of events to be detected by the computer system.

A first level event class 54 is defined in this example as SecurityBreachEvent. Two second level, children event classes 56a and 56b depend from a parent event class 54. In this example, event class 56a is defined as PhysicalBreach and event class 56b is defined as NetworkBreach. Event class 56a is itself a parent with respect to third level, children event classes 58a–n, which are defined as Building1-n_Breach, respectively. Likewise, event class 56b is a parent to third level, children event classes 60a–n, which are defined as Servers1-n_Breach, respectively.

In this embodiment, each event class can be defined to have any desired parameters. For example event classes 58a–n (Building1-n_Breach) can each be defined:
C1) Class Building[X]_Breach
  sint 32 Entrance
  string ReponsibleParty
In the foregoing example [X] represents the number of the building. The parameters "Entrance" (signed integer) and "ResponsibleParty" (string) are associated with event classes 58a–n (Building1-n_Breach). Accordingly, when an event belonging to one of event classes 58a–n is reported to event-filtering core 48, the instance of the event includes arguments representing the values of the parameters Entrance and ResponsibleParty.

As event providers 40, 42, and 44 notify event-filtering core 48 of the occurrence of the events dealing with security breaches, each event will belong to at least one of the event classes illustrated in FIG. 4. For example, if a system operating according to the invention detects an event consisting of a breach of security in building 2, that event belongs to event class 58b. Because event class 58b is a child of event class 56a, which in turn is a child of event class 54, the detected event also belongs to event classes 56a and 54.

Event-Filtering and Event-Reporting Definitions

In order to filter the events reported from event providers 40, 42, and 44 to select the events to be reported to event subscribers 36, event-filtering core 48 maintains, in one embodiment of the invention, event-filtering definitions associated with each event subscriber. While the event-filtering definitions can be any mechanism for selecting only the events to be reported to particular event subscribers 36, in one embodiment the definitions are constructed in a query language written in the context of the event classification stored in schema repository 46. Any query language can be used according to the invention. By way of example and not limitation, the query language may be Structured Query Language (SQL), which may be modified or extended as desired.

In the Venn diagram of FIG. 5A, the set of possible events 62 includes the events comprehended by the event classes of the event classification. In reference to the schema in the example of FIG. 4, the set of possible events 62 of FIG. 5A includes at least any security breach event. In general, depending on the types of drivers, event providers, or other instrumentation associated with the computer system, the occurrence of any of the possible events 62 can be reported to the event-filtering core.

In this embodiment, each event subscriber 36 registers with the event-filtering core 48 by providing a subscriber registration 64 that includes the associated event-filtering definition designates which of the possible events are subscriber-requested events. As shown in FIG. 5A, subscriber registration 64 defines a subset of the set of possible events 62. As used herein, "subset" can be smaller or coextensive with the set in which it is subsumed.

In one example, subscriber registration 64 may comprise the event-filtering definition:
Q1) select * from SecurityBreachEvent.
In this case, event-filtering core 48 would interpret the event-filtering definition as a request to receive a report of the occurrence of any event belonging to class 54 of FIG. 4. Accordingly, when event-filtering core 48 receives, from any event provider, a report of an event belonging to event class 54 or any of the children event classes 56a, 56b, 58a–n, or 60 a–n, the event is reported to the event subscriber associated with the definition. As shown in FIG. 5A, the subscriber registration subset 64 associated with the foregoing event-filtering definition would include all of the possible events 62 that are classified under event class 54 or any of its children classes.

The event-filtering definition:
Q2) select * from Building2_Breach
  where Entrance>3
limits the requested subset of events 64 to those belonging to event class 58b (Building2_Breach) and having an Entrance parameter greater than 3 (e.g., indicating that the security of an entrance # 4, 5, 6 . . . or n of Building 2 has been breached). Events not satisfying the "where" clause of query Q2 or, in other words, those not having an a value of the Entrance parameter that satisfies the where clause, do not belong to the subset of events defined by query Q2 and are not reported to the associated event subscriber.

In one embodiment of the invention, each event provider 40, 42, and 44 also registers with event-filtering core 48 by supplying a provider registration 66 that includes an associated event-reporting definition, thereby guaranteeing to the event-filtering core that any event reported by the particular event provider will satisfy the definition. Like the event-filtering definitions, the event-reporting definitions can be written in the query language. Referring to FIG. 5B, the event-reporting definition of the provider registration defines a subset 66 of the set of possible events 62.

For example, provider registration 66 may comprise the event-reporting definition:
Q3) select * from NetworkBreach
which indicates that any event reported by the associated event provider will belong to event class 56b or to any of the children classes 60a–n.

The event-reporting definition:
Q4) select * from Building2_Breach
  where Entrance<5
indicates that the associated event provider will only report events belonging to class 58b (Building2_Breach) and having an Entrance parameter less than 5 (e.g., indicating that the security of an entrance # 1, 2, 3, or 4 of Building 2 has been breached).

In another example, an event subscriber could register the following event-filtering definition with the event-filtering core:
Q5) select * from SecurityBreachEvent
  where (Building<>8 and Severity<3) or Severity<2
In this example, event class SecurityBreachEvent is associated with parameters Severity and Building. This query specifies that the associated event subscriber is to be notified of security breach events having a Severity parameter value of 1 or 2 in all buildings other than building 8, and of security breach events having a Severity parameter value of 1 in building 8.

In order to further illustrate the capabilities of the query-based event-filtering definitions, the additional examples are presented below. In the following discussion, "instrinsic" events include those that relate to the creation of data with respect to the configuration of a computer or a computer network. For example, events consisting of the installation, deinstallation, or modification of a hardware or software components are intrinsic, since their occurrence causes the configuration of the system to change. In contrast "extrinsic" events are those that relate to activity in or in the environment of a computer or computer network, but do not relate to the configuration of the computer or computer network. Examples of extrinsic events include disk drive activity and errors, network server activity and failure, and security breaches.

In order to monitor installation, deinstallation, and modification of hardware and software components, the event classification in the schema repository could be supplemented with intrinsic event classes directed to the installation, deinstallation, and modification of hardware and software components. Intrinsic event classes could be defined as follows:
C2) class InstanceCreationEvent
  object TargetInstance;
C3) class InstanceDeletionEvent
  object TargetInstance
where TargetInstance is a parameter of the classes InstanceCreationEvent and InstanceDeletionEvent, and which has, as its value, an object-oriented data class specifying the hardware component or software component installed.

Data classes could be defined as follows:
C4) class Win32_Modem;
C5) class Video_Card;
C6) class Win32_Service;
and so forth, each being associated with the specified hardware or software component. Moreover, the data classes can be associated one with another in parent/child relationships. For example, each data class that relates to a hardware component can have child classes specifying particular manufacturers.

In one example, an event subscriber could register the event-filtering definition:
Q6) select * from__InstanceCreationEvent
  where TargetInstance isa "Win32_Modem" and
  (TargetInstance.Manufacturer="USRobitics" or
  TartetInstance.Manufacturer="Hayes")
The foregoing query illustrates the use of an operator "isa", which associates a parameter of the event class with a selected data class. In this example, the operator "isa" associates the parameter TargetInstance with the specified data class Win32_Modem. This query would result in the event subscriber being notified of the installation of Win32 modems manufactured by US Robotics or Hayes.

In yet another example, an event subscriber could register the event-filtering definition:
Q7) select * from InstanceDeletionEvent
  where TargetInstance isa "Win32_Service" and not TargetInstance.State ="Running"
The foregoing query specifies that the event subscriber is to receive notification of the deinstallation of a Win32 service that is not in a running state.

The event-filtering definitions and event-reporting definitions facilitate the filtering of events as they are received from the event providers. Referring to FIG. 5C, the intersection 68 of subsets 64 and 66 represents for example, the events defined by query-based definitions Q2 and Q4, above. In particular, query Q2 (i.e., subset 64) specifies that any event associated with a security breach of an entrance # 4, 5, 6 . . . or n of Building 2 is to be reported to the associated event subscriber 36. Similarly, query Q4 (i.e., subset 66) indicates that the associated event provider will report only security breaches of an entrance # 1, 2, 3, or 4 of Building 2. The intersection 68 of queries Q2 and Q4 indicates in this example that when an event of a security breach of entrance 4 of Building 2 is reported by the event provider, that event is reported to the event subscriber. If other events requested by the event subscriber are to be reported (e.g., breach of entrance 5, 6 . . . n of Building 2), the event must be detected by another event provider.

The event-reporting definitions associated with the event providers can greatly simplify the filtering process in many cases. For example, consider an event subscriber associated with query Q1 and an event provider associated with query Q3. In this case, as illustrated by FIG. 5D, the subset of events 66' that satisfy query Q3 are subsumed within the subset of event 64' that satisfy query Q1. In this case, any event supplied by the event provider necessarily satisfies the event-filtering definition associated with the event subscriber. Accordingly, the event-filtering core 48 does not need to analyze the particular parameters or event class of the event provided according to query Q3, but instead can always report the event to the event subscriber.

Furthermore, the event-reporting and event-detecting definitions allow event providers 40, 42, and 44 to be activated only when there is an event subscriber 36 interested in receiving reports from the event provider. For example, consider a situation in which only queries Q2 and Q3 are registered with the event-filtering core 48. In this case, there is no event subscriber 36 registered with event-filtering core 48 that is interested in any event that could be reported by the event provider associated with query Q3. In particular, the event subscriber associated with query Q2 is not interested in learning of any event classified under event class 56b (NetworkBreach) or any of its children event classes 60a–n (Server1-n_Breach). Accordingly, the particular event provider is not activated until such time that an interested event subscriber registers with the event-filtering core.

FIG. 6 is a schematic diagram further illustrating features and elements of event-filtering core 48 of FIG. 3. Referring to FIG. 6, event-filtering core 48 includes, according to one embodiment of the invention, an event subscriber registrations repository 70 and a provider registrations repository 72. When event-filtering core 48 is initialized on a computer system or when an event subscriber 36 is installed, the event subscriber registers an event-filtering definition, examples of which are queries Q1 and Q2 discussed above. Likewise, event providers 40, 42 and 44 register at provider registrations repository 72, an event-reporting definition, examples of which include queries Q3 and Q4.

In this embodiment, event-filtering core 48 assembles one or more filtering trees 74 or another suitable filtering mechanism in filtering module 76. Filtering trees 74 constitute an example of means for comparing a reported event against one or more event-filtering definitions associated with event subscribers. Filtering trees 74 or the other filtering mechanism used in the invention are assembled using the event classes defined in the schema repository. Each event provider can have one dedicated filtering tree 74 defined in filtering module 76. After comparing the reported events against the event-filtering definitions using filtering trees 74, any events satisfying the event-filtering definitions result in an event report 80 being sent to the appropriate event subscriber or subscribers.

In cases where no event provider exists on the computer system for notifying event-filtering core 48 of the occurrence of the particular events, a polling module 78 actively identifies when the particular events have occurred. For example, if a computer system includes a disk drive without an associated event provider and an event subscribers has requested a report of events at the disk drive, polling module 78 may periodically determine whether events of interest have occurred at the disk drive.

Figure 7:
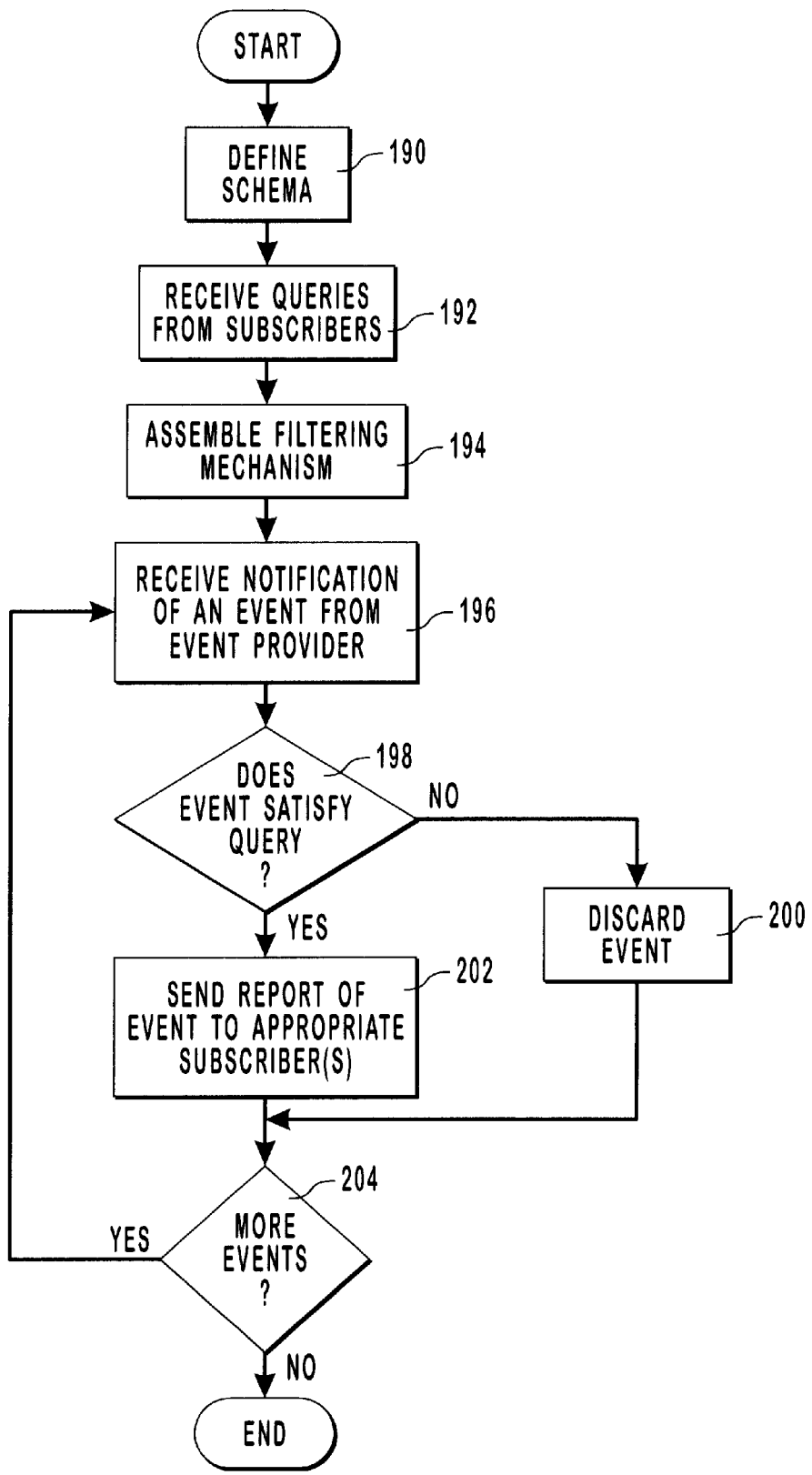
FIG. 7 is a flow diagram illustrating a method for filtering a plurality of events reported by event providers to identify the events to be reported to an event subscriber.

FIG. 7 depicts the steps of one embodiment of the methods for filtering events using, for example, the structure and event classifications illustrated in FIGS. 2–6. In step 190, the schema that organizes the hierarchical classification of event classes is defined according to the methods described herein. In step 192, the event-filtering core receives and registers queries from subscribers defining the subsets of events to be reported thereto. In step 194, the event-filtering core assembles a filtering mechanism based on the queries received from the subscribers and the event classification defined in the schema. Once the filtering mechanism is in place, event providers associated with the computer system provide notification of an event as illustrated by step 196.

According to decision block 198, the system determines whether the event detected in step 196 satisfies one or more queries associated with the event subscribers. If the event does not satisfy any query, the event is discarded in step 200 without being reported to an event subscriber. If, however, the event satisfies one or more of the queries, a report of the event is sent to the appropriate event subscriber or subscribers as illustrated by step 202. As shown in decision block 204, the method can continue detecting and reporting events as desired.

Time-Sensitive Event Filtering and Grouping
1. Event Aggregation

Figure 8:
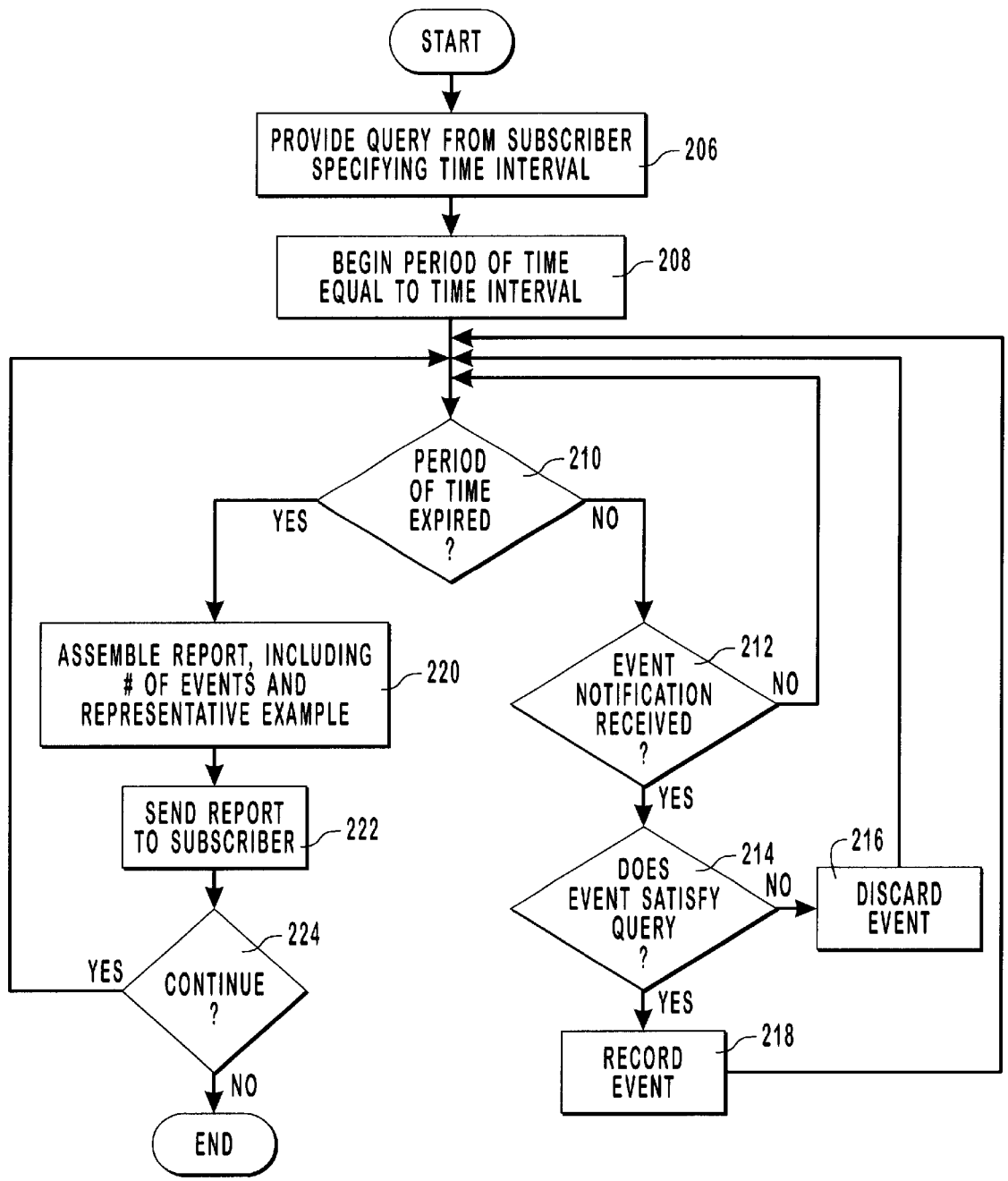
FIG. 8 is a flow diagram depicting a method for generating a report of events detected over a period of time, wherein the report is to be provided to the event subscriber.
Figure 9:
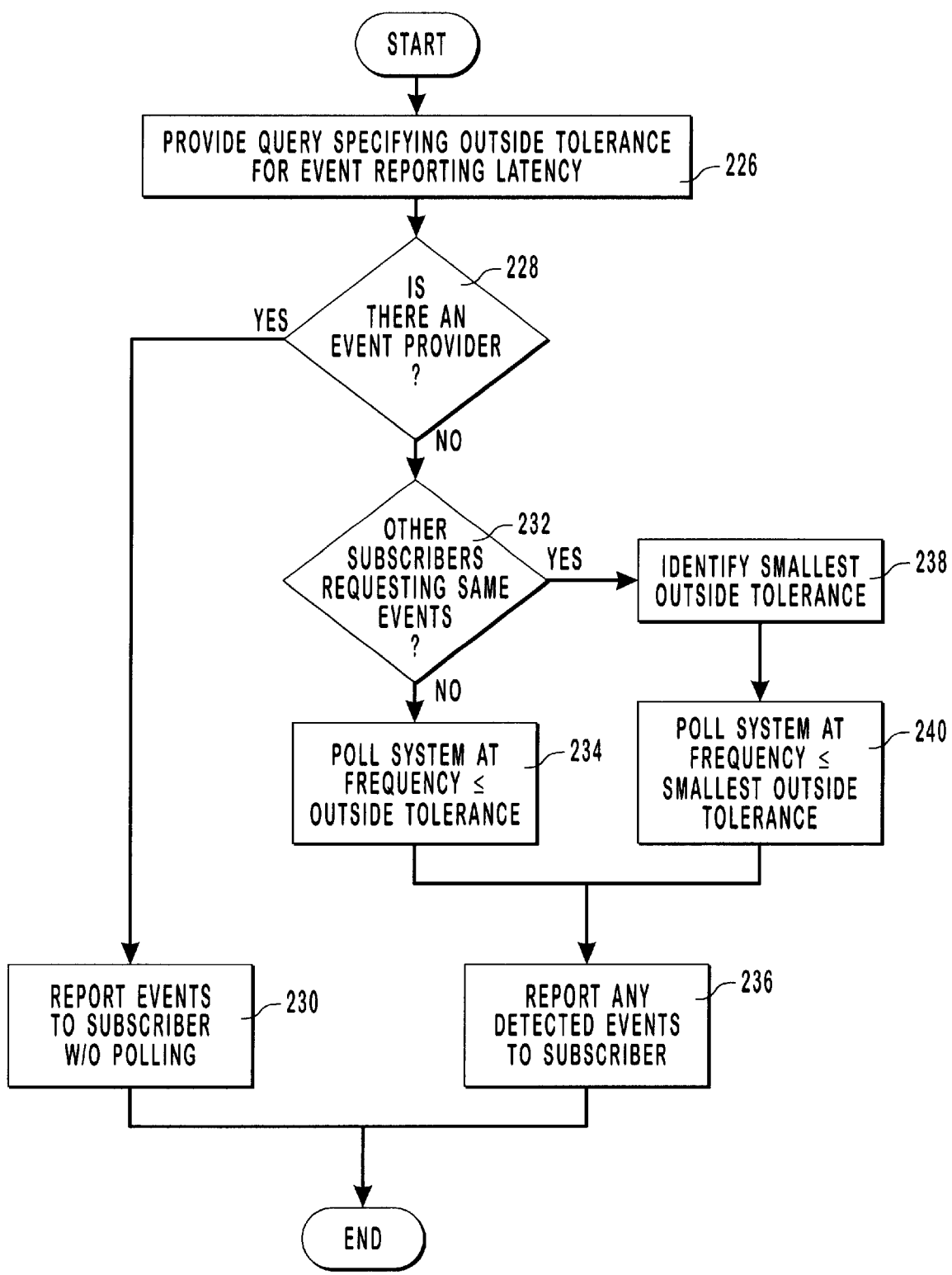
FIG. 9 is a flow diagram illustrating a method whereby the occurrence of a selected event is reported to the event subscriber within a period of time after its occurrence that is no greater than a maximum event reporting latency specified by the event subscriber.

FIGS. 8 and 9 depict methods whereby events are filtered, grouped, or both, based on the time that the events occur using a query language, such as SQL, that has been extended to include time-functional syntax. For example, some event subscribers may need only periodic reports or summaries of events that have occurred in a computer, a computer network, or in the environment of a computer system. An event subscriber may be interested to receive a report each day of the number of security breaches in a building. The event-filtering definition associated with such an event subscriber may be constructed:

Q8) select * from Building1_Breach group
within 86400 by Entrance

This event-filtering definition indicates that the event subscriber is to receive a daily summary (every 86,400 seconds) of the number of security breaches in Building 1. The summary will group the events by the value of the parameter Entrance.

Another event subscriber might register an event-filtering definition:

Q9) select * from NetworkBreach group within 3600
having number of events>10

This definition indicates that the event subscriber is to receive an hourly summary (every 3,600 seconds) of the number of network security breaches, but only if the number within the hour has been greater than 10. The foregoing examples are presented for illustrative purposes, and the queries in any particular situation may be as broad or narrow as desired.

FIG. 8 depicts a method for reporting and grouping events according to a query similar to query Q8. In step 206, the event subscriber registers an event-filtering definition that, like query Q8, requests only a periodic summary of the events satisfying the query. The event-filtering definition can include a time interval for the periodic reporting, which in the example of query Q8 is 86400 seconds.

Including the time interval in the query is particularly useful, for example, in situations where events happen relatively frequently and reporting individual events would generate considerable data traffic within the system. Instead, periodic summaries are generated according to this technique, thereby potentially significantly reducing the amount of data to be transmitted. The time interval is also useful when a summary of events is more manageable than real-time reports.

In step 208, the event-filtering core begins monitoring events during a period of time equal to the time interval specified in the query. According to decision block 210, if the period of time has not yet expired, the system continues to receive and monitor event notifications originating from the event providers. Decision block 210, along with decision block 212, indicates that the system continues to monitor events to be included in the summary so long as the period of time has not expired. As shown at decision block 212, if an event notification is received, the method proceeds to decision block 214, in which the event is compared to the event-filtering definition. If the event does not satisfy the definition, the method proceeds to step 216, in which the event is discarded, and the system continues to receive events. If, on the other hand, the event satisfies the query, the event is recorded in step 218 by the event-filtering core for later inclusion in the summary sent to the event subscriber. The routine comprising steps 210, 212, 214, 216, and 218 is repeated until the period of time expires, at which point the method advances from decision block 210 to step 220.

In step 220, the event-filtering core assembles the report that includes, in one embodiment, the number of events that have been detected during the period of time. The report can further include a representative example of the summarized events. When the event-filtering definition include a "group" clause as does query Q9, the report can group the events in the defined manner. In step 222, the report is sent to the subscriber. If the event-filtering core is to continue detecting and reporting events, the method proceeds from decision block 224 to decision block 210 as shown in FIG. 8.

2. Polling

FIG. 9 illustrates a method whereby drivers or other instrumentation that do not have associated event providers are periodically polled by the event-filtering core to learn of the occurrence of events. The method of FIG. 9 can be particularly useful to detect installation, deinstallation, or modification of hardware or software components. In order to manage the polling frequency, the event-filtering definitions can specify an outside tolerance of the event reporting latency that is to be allowed to elapse between the occurrence of an event and the reporting of the occurrence to the event subscriber.

In one implementation, the systems of the invention may be used to monitor the installation of modems in a computer network. In this case, the event classification in the schema repository could be supplemented with intrinsic event classes directed to the installation, deinstallation, and modification of hardware components, such as classes C2 and C3, above. Moreover, classes C2 and C3 and other intrinsic event classes can have one or more parameters that may have as their values particular data classes, such as classes C4–C6, defined above.

In this example, an event subscriber 36 could be associated with the event-filtering definition:

Q10) select * from InstanceCreationEvent within 3600
    where TargetInstance isa "Win32_Modem"

This event-filtering definition specifies that the event subscriber is to receive reports of the installation of Win32 modems. In particular, when the occurrence of an InstanceCreationEvent (i.e., installation of hardware) is detected, and the parameter of the event has the value of "Win32_Modem", the event subscriber is to be notified.

Because modem installations and other intrinsic events often occur relatively infrequently, it might be considered inefficient to frequently check for their occurrence. In addition, there may not be an event provider dedicated to monitoring the installation of modems or other hardware. Accordingly, the clause "within 3600" of query Q10 instructs the event-filtering core 48 to poll the computers in the computer network at a frequency of once every hour (3,600 seconds) or fewer if there is no event provider to report modem installations. For example, polling module 78 of FIG. 6 can be used to execute the polling operation according to one embodiment. Extrinsic events can also be detected and reported using the polling procedures disclosed herein.

It is noted that, in this embodiment, the "within" clause specifies an outside tolerance of the reporting latency. If another event subscriber has, for example, an event-filtering definition:

Q11) select * from InstanceCreationEvent within 1800
    where TargetInstance isa "Win32_Modem"

the system of the invention will poll, if polling is necessary, at a frequency of once every 30 minutes (1,800 seconds) or fewer.

FIG. 9 illustrates one method for polling the components of the computer system based on event-filtering definitions that, like queries Q10 and Q11, define an outside tolerance for event-reporting latency. In step 226, the event subscribers register event-filtering definitions including an outside tolerance for event reporting latency. In step 228, the event-filtering core or another component determines whether the system includes an event provider that will report any occurrences of the specified events. If so, the method proceeds to step 230, in which no polling is necessary, and events are reported as otherwise described herein. In this case, no polling is necessary since it can generally be assumed that events will be reported to the event-filtering core 48 at rates faster than the outside tolerance of the event reporting latency.

If, however, there is no event provider, which may be the case with respect to the queries Q10 and Q11, the method advances from decision block 228 to decision block 232. For purposes of illustration, it is assumed that query Q10 has been registered in step 226. According to decision block 232, it is determined that query Q11 has also been registered. Thus, the method advances to step 238, in which the smallest outside tolerance is identified. In this example, query Q10 has an outside tolerance of 3,600 seconds, whereas query Q11 has an outside tolerance of 1,800 seconds. In step 240, the system is polled periodically at a time interval no greater than the smallest tolerance (1,800 seconds). Therefore, in step 236, any detected events that satisfy the queries can be reported to both event subscribers at a frequency of once every 1,800 seconds or fewer, thereby meeting the demands of both outside tolerances.

If there had only been one subscriber requesting the events, the method would have proceeded from decision block 232 to step 234. For example, if only query Q10 had been registered, the system would have been polled in step 234 at a frequency of once every 3,600 seconds or fewer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system including an event provider for reporting to an event-filtering component of the computer system the occurrence of events in the computer system or in the environment of the computer system, a method for selecting a subset of the events to be reported by the event-filtering component to an event subscriber associated with the computer system, the method comprising the steps of:

storing, in a computer-readable medium accessible by the computer system, a hierarchical classification of event classes that comprehend a set of possible events, wherein each of the possible events belongs to at least one of the event classes;

providing to the event-filtering component an event-reporting definition written in a query language and specifying a first subset of the set of the possible events, wherein the event-reporting definition is associated with the event provider and specifies that events to be reported by the event provider to the event-filtering component will belong to the first subset;

providing to the event-filtering component an event-filtering definition written in the query language and specifying a second subset of the set of possible events comprehended by event classes, wherein the event-filtering definition is associated with the event subscriber and specifies that events belonging to the second subset are to be reported by the event-filtering component to the event subscriber;

by the event provider, reporting to the event-filtering component the occurrence of events in the computer system or in the environment of the computer system that have been detected by an event-detection component; and by the event-filtering component, using the event-filtering definition to report to the event subscriber the occurrence of only those of the events that belong to both the first subset and the second subset.

2. A method as defined in claim 1, wherein the occurrence of events in the computer system is detected using more than one event-detection component.

3. A method as defined in claim 2, wherein the step of reporting, to the event-filtering component, the occurrence of events comprises the step of sending notifications, by each of the more than one event-detection components, of the occurrence of the events to the event-filtering component via a standard interface associated with the event-filtering component.

4. A method as defined in claim 1, wherein the event-filtering definition includes a where clause, such that events not having a value of a parameter that satisfies the where clause do not belong to the second subset of the set of possible events.

5. A method as defined in claim 1, further comprising the step of detecting the occurrence of events by periodically polling the event-detection component.

6. A method as defined in claim 1, further comprising, prior to the step of reporting, to the event-filtering component, the occurrence of events, the step of activating the event-detection component in response to a determination that the event-detection component is configured to report the occurrence of events that belong to the second subset of the set of possible events.

7. A method as defined in claim 1, wherein:

the step of reporting, to the event-filtering component, the occurrence of events is conducted during a period of time equal to a time interval specified by the event-filtering definition; and the step of using the event-filtering component to report to the event subscriber comprises the step of transmitting to the event subscriber a summary of a group of events that includes only the events that have been detected during the period of time and belong to the subset of the second set of possible events.

8. A method as defined in claim 1, wherein the event-filtering definition further specifies a maximum reporting latency that is to be allowed to elapse between the occurrence of an event belonging to the second subset and the event-filtering definition reporting to the event subscriber event subscriber of the occurrence, and wherein the method further comprises the steps of:

determining that the computer system does not execute an event provider computer program for automatically reporting each occurrence of the event belonging to the second subset; and periodically, at time intervals no greater than the maximum reporting latency, polling the event-detection component to determine whether the event belonging to the second subset has occurred.

9. A method as defined in claim 1, wherein the hierarchical classification of event classes defines at least a first event class and a second event class in a parent/child relationship.

10. A method as defined in claim 1, wherein:

the first subset is subsumed by the second subset, such that any event reported by the event provider necessarily belongs to both the first subset and the second subset; and the step of using the event-filtering definition to report to the event subscriber the occurrence of only the events that belong to both the first subset and the second subset is conducted without the event filtering component analyzing parameters or an event class of the events reported by the event provider.

11. A method as defined in claim 1, wherein the computer system further includes a second event provider, the method further comprising the step of providing to the event-filtering component another event-reporting definition written in the query language and specifying another subset of the set of the possible events, wherein said other event-reporting definition is associated with said other event provider and specifies that events to be reported by said other event provider to the event-filtering component will belong to the third subset.

12. A method as defined in claim 11, further comprising the steps of:

by said other event provider, reporting to the event-filtering component the occurrence of other events in the computer system or in the environment of the computer system by the event-filtering component, using the event-filtering definition to report to the event subscriber the occurrence of only those of said other events that belong to both the second subset and the third subset.

13. A method as defined in claim 11, wherein the second subset and the third subset do not intersect, such that necessarily none of said events that could be reported by said other event provider would belong to both the second subset and the third subset, and wherein said other event provider is accordingly not activated.

14. In a computer system including an event-detection component for detecting events in the computer system or in the environment of the computer system, a method for selecting a subset of the events to be reported by an event-filtering component of the computer system to an event subscriber associated with the computer system, the method comprising the steps of:

storing, in a computer-readable medium accessible by the computer system, a hierarchical classification of event classes that comprehend a set of possible events, wherein each of the possible events belongs to at least one of the event classes and wherein the hierarchical classification defines at least a first event class and a second event class in a parent/child relationship;

providing to the event-filtering component an event-filtering definition written in a query language and specifying a subset of the set of possible events comprehended by event classes, the event-filtering definition further specifying a time interval, wherein the event-filtering definition is associated with the event subscriber and specifies that events that belong to the subset and are detected during the time interval are to be reported by the event-filtering component to the event subscriber;

detecting the occurrence of events in the computer system or in the environment of the computer system using the event-detection component during a period of time equal to the time interval;

generating by the event-filtering component a summary of a group of events that includes only the events whose occurrence has been detected during the period of time and that belong to the subset of the set of possible events; and reporting the summary to the event subscriber.

15. A method as defined in claim 14, wherein the step of generating a summary comprises the step of including in the summary the number of occurrences of the events that belong to the subset.

16. A method as defined in claim 14, wherein the step of generating a summary comprises the step of including in the summary a representative example of the events that belong to the subset.

17. A method as defined in claim 14, wherein the step of generating a summary comprises grouping the events according to the value of a parameter associated with the events, the value being defined in the event-filtering definition.

18. In a computer system including an event-detection component for detecting events in the computer system or in the environment of the computer system, a method for selecting a subset of the events to be reported by an event-filtering component of the computer system to an event subscriber associated with the computer system, the method comprising the steps of:
- storing, in a computer-readable medium accessible by the computer system, a hierarchical classification of event classes that comprehend a set of possible events, wherein each of the possible events belongs to at least one of the event classes;
- providing to the computer system a first event-filtering definition written in a query language and specifying a subset of the set of possible events comprehended by event classes, the first event-filtering definition further specifying a first maximum reporting latency that is to be allowed to elapse between the occurrence of an event belonging to the subset and the event subscriber being notified of the occurrence;
- determining that the computer system does not execute an event provider computer program for automatically reporting each occurrence of the event belonging to the subset; and
- periodically, at time intervals no greater than the first maximum reporting latency, determining whether the event belonging to the subset has occurred by polling the event-detection component.

19. A method as defined in claim 18, further comprising, whenever the event belonging to the subset has occurred, the step of reporting, to the event subscriber, the occurrence of the event belonging to the subset within a period of time after the occurrence no greater than the first maximum reporting latency.

20. A method as defined in claim 18, further comprising the steps of:
- providing to the computer system a second event-filtering definition associated with a second event subscriber and specifying a second maximum reporting latency that is to be allowed to elapse between the occurrence of the event belonging to the subset and the second event subscriber being notified of the occurrence; and
- determining which of the first event-filtering definition and the second event-filtering definition specifies a smaller maximum reporting latency;
- wherein the step of periodically determining whether the event belonging to the subset has occurred is conducted at time intervals no greater than the smaller maximum reporting latency.

21. A method as defined in claim 18, wherein the subset of the set of possible events includes events associated with installation of hardware components or software components to the computer system.

22. A method as defined in claim 18, wherein the subset of the set of possible events includes events associated with deinstallation of hardware components or software components to the computer system.

23. A method as defined in claim 18, wherein the subset of the set of possible events includes events associated with modification of hardware components or software components to the computer system.

24. A computer system for reporting the occurrence of events in the computer system or in the environment of the computer system to an event subscriber, the system comprising:
- an event-detection component capable of detecting events in the computer system or in the environment of the computer system and generating notifications of the occurrence of the events;
- an event subscriber capable of receiving reports of the occurrence of at least some of the events;
- a computer-readable medium accessible by the computer system having stored therein a hierarchical classification of event classes that comprehend a set of possible events, wherein each of the possible events belongs to at least one of the event classes and wherein the hierarchical classification defines at least a first event class and a second event class in a parent/child relationship;
- an event-filtering module providing an interface to the event-detection component and being capable of identifying which of the events are to be reported to the event subscriber, the event-filtering module including:
  - means for receiving an event-filtering definition written in a query language and specifying a subset of the set of possible events comprehended by event classes, wherein the event-filtering definition is associated with the event subscriber and specifies that events belong to the subset are to be reported by the event-filtering component to the event subscriber;
  - means for receiving notification of the occurrence of events detected by the event-detection component; and
  - means for using the event-filtering definition to report to the event subscriber the occurrence of only those of the events that belong to both the first subset and the second subset.

\* \* \* \* \*

UNITED STATES PATENT AND TRADEMARK OFFICE
CERTIFICATE OF CORRECTION

| | | |
|---|---|---|
| PATENT NO. | : 6,367,034 B1 | Page 1 of 1 |
| DATED | : April 2, 2002 | |
| INVENTOR(S) | : Lev Novik, Raymond McCollum and Irena Hudis | |

It is certified that error appears in the above-identified patent and that said Letters Patent is hereby corrected as shown below:

<u>Column 17,</u>
Line 50, before "of the occurrence" delete second instance of "event subscriber"

Signed and Sealed this

Twenty-fourth Day of September, 2002

Attest:

Attesting Officer

JAMES E. ROGAN
*Director of the United States Patent and Trademark Office*